June 5, 1962        G. E. BEARDSLEY, JR        3,037,377
APPARATUS FOR GENERATING A STANDING WAVE IN A LIQUID
Filed Oct. 7, 1957
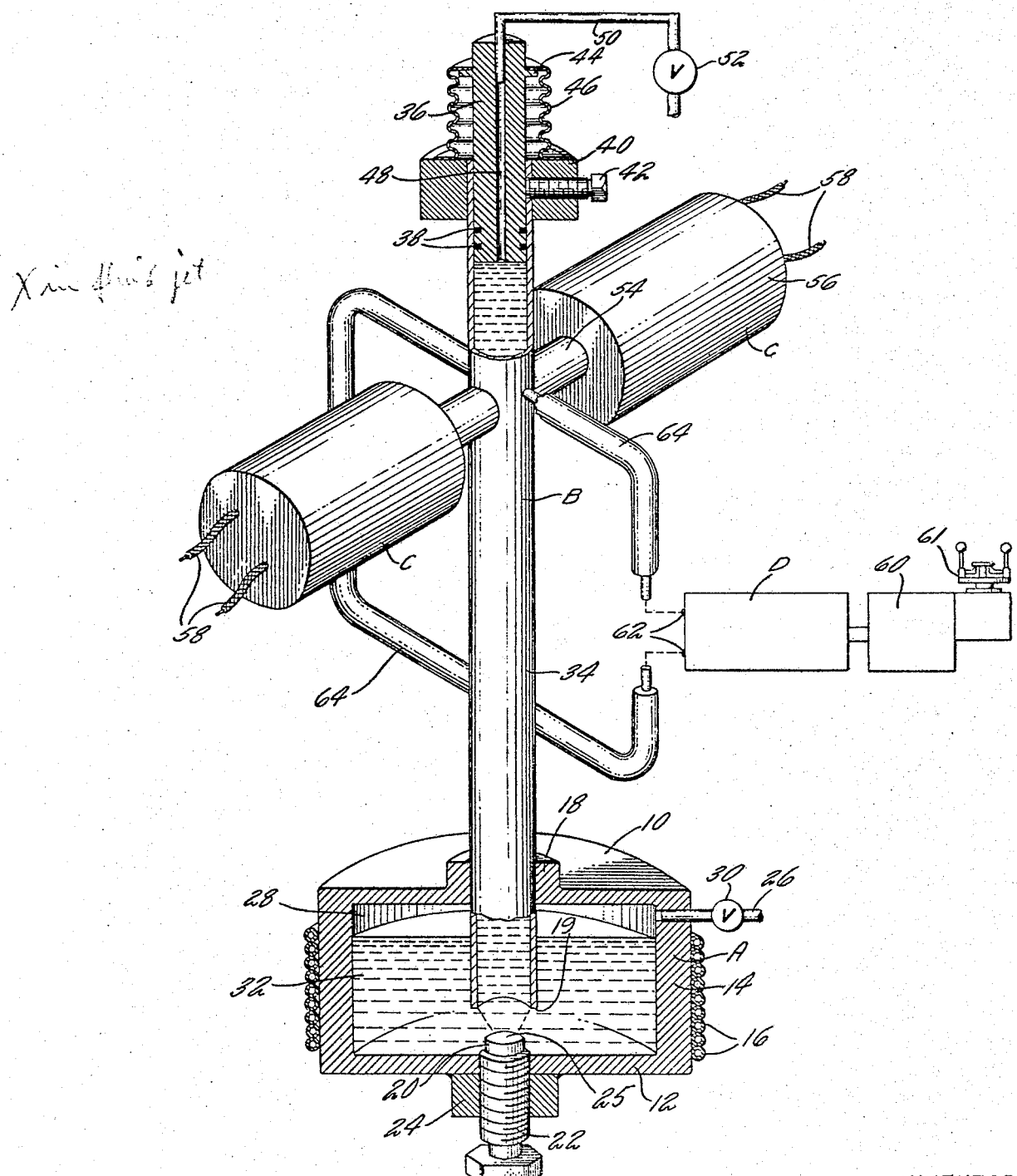
INVENTOR
GUY E. BEARDSLEY JR.
BY M. B. Tasker
ATTORNEY

United States Patent Office 3,037,377
Patented June 5, 1962

3,037,377
APPARATUS FOR GENERATING A STANDING WAVE IN A LIQUID
Guy E. Beardsley, Jr., West Hartford, Conn., assignor to United Aircraft Corporation, East Hartford, Conn., a corporation of Delaware
Filed Oct. 7, 1957, Ser. No. 688,557
12 Claims. (Cl. 73—71.5)

This invention relates to apparatus for producing a controlled state of cavitation in liquids.

In a standing wave the point of reflection is a fixed point and is the point at which the maximum variation of pressure occurs. By locating a test specimen at this point it has been demonstrated that the phenomenon of cavitation erosion can be produced on the surface of the specimen.

A primary object of this invention is to provide a test apparatus for simulating the cavitation phenomenom at the surface of a selected test specimen thus enabling the erosive effects on various materials in different liquids to be evaluated.

Other objects of the invention are to provide a test apparatus for generating a standing wave in a liquid for the purpose of testing various solid materials for their resistance to cavitation; for testing these materials at various temperatures above room temperature; and in general, to provide test equipment of this type which is convenient and economical to use.

A further object of the invention is to provide an improved apparatus for generating a standing wave in an electrically conducting liquid.

These and other objects and advantages of the invention will be evident from the following detailed description of a preferred embodiment of the invention shown in the accompanying drawing. The single FIGURE of the drawing is a perspective view, partly in section, of the apparatus embodying the invention.

As shown in the drawing, this apparatus consists essentially of four units: (1) a testing vessel A, (2) a tube B containing electrically conducting liquid, (3) a pair of electromagnets C, and (4) a variable frequency A.C. generator D.

A test vessel A, as herein shown, consists of a closed chamber having a top wall 10, a bottom wall 12, and a cylindrical side wall 14. Electric heating wires 16 surround the side walls 14 for a purpose hereinafter described.

The top wall 10 of vessel A is provided with a boss 18 through which the open end 19 of the tube B is extended into the vessel. The tube may be welded to the boss or otherwise secured therein in a fluid tight manner. Vessel A supports the test specimen 20 on its bottom wall 12 directly below the open end 19 of tube B. In order that the specimen may be moved toward and away from the open end of tube B, the specimen 20 is secured in a suitable manner to the end of a stud 22 which is threaded into the bottom of vessel A in axial alignment with tube B, a boss 24 being welded to the bottom 12 of vessel A to provide a suitable threaded support for the stud so that by rotating the stud the surface 25 of the specimen can be brought exactly to the point of reflection of a standing wave set up in the column of liquid in the tube B. A conduit 26 communicates with the upper portion of vessel A for the admission of an inert gas under pressure into chamber 28 above the liquid in the vessel as controlled by the valve 30. Initially, vessel A is filled with a conducting liquid 32, some of which is displaced upwardly into tube B as the inert gas is admitted into the vessel.

Tube B, which may be made of stainless steel or other suitable material, consists of a straight cylindrical tube 34, open at both ends, the lower end 19 of which is received in vessel A. The effective length of the tube in which the liquid may rise is varied by a piston 36 which can be adjusted axially in the upper portion of tube B. Piston 36 is provided with suitable rings or packings 38 which effect a fluid tight seal with the inner wall of the tube as the latter is moved axially therein.

Means are provided for holding the piston 36 in a selected axial position thereof relative to the tube, comprising an external collar 40 which is welded to the upper end of tube B in which a set screw 42 is threaded which extends through tube B and engages the piston. Piston 36 is provided with a flange 44 to which the upper end of a flexible bellows 46 is secured in a fluid tight manner. The lower end of bellows 46 is secured in a fluid tight manner to the upper surface of collar 40. This arrangement provides a fluid tight seal for the upper end of tube B while permitting the piston 36 to be axially adjusted relative thereto. Piston 36 is provided with an axial passage 48 through which air may escape as the liquid rises in tube B beneath the piston. A conduit 50 and a valve 52 control the bleeding of this air out of the upper end of the tube. Under some conditions it may be desirable to use an inert gas, such as argon, in the tube above the liquid column.

The two electromagnets C are located at diametrically opposite positions relative to tube B and are identical in construction. Each electromagnet includes a metallic core 54 and a surrounding winding 56. The cores 54 of the electromagnets are cylindrically concave at their ends where they abut tube B to minimize the air gap between the cores and the tube. If desired, the magnet cores may be welded to the tube. The leads 58 of the magnets may be connected to any suitable exciting source of direct current (not shown). Permanent magnets may be used if desired.

The generator D is of the variable frequency A.C. type connected with any suitable prime mover and having output terminals 62. Herein the generator D has been shown as driven by a prime mover 60 having a speed governor 61 which can be adjusted to vary the speed of the prime mover and the connected generator over a wide range. This prime mover could be a variable speed electric motor, a turbine or a gasoline engine. Conductors 64, which are connected to terminals 62, are electrically connected to the cylindrical side walls 34 of the tube B at diametrically opposite points at the plane of the magnetic field of electromagnets C and at right angles to this field.

In the operation of this device the test specimen 20 is soldered or otherwise secured to stud 22 and this stud is screwed into the bottom wall 12 of vessel A. The surface 25 of the test specimen is exposed directly below the open end of tube B. The liquid 32 is then introduced into vessel A and an inert gas under pressure is supplied through pipe 26. As the liquid is displaced from vessel A it is forced upward in tube B to a suitable level above the horizontal plane including electromagnets C and the leads 64 of the generator D. The gas above the liquid in the tube may be expelled completely through conduit 50 by opening valve 52 or any desired volume of gas may be left above the liquid in the tube.

As current is supplied to the electromagnets C a constant magnetic field is set up through the tube B and the conducting liquid which it contains. By passing the current in the variable frequency A.C. generator D through the liquid in the tube at the plane of the electromagnetic field and at right angles to it, the conducting liquid in the tube will be caused to oscillate at the frequency of the generator. By varying the frequency of the current and suitably varying the length of the column of conducting fluid in the tube, either by adjusting the piston 36 or by manipulation of the valves 30 and 52, a resonant oscillation of the liquid in the tube can be produced and a standing wave created in the liquid. By adjusting the threaded stud 22 which carries the specimen 20, it is possible to bring the surface 25 of the specimen to the point of reflection of the standing wave set up in the liquid in the tube with the result that cavitation erosion of the surface specimen will take place.

By the use of this apparatus a simulation of the cavitation phenomenom can be produced at the surface 25 of the test specimen 20 and the effects on various materials and various liquids can be evaluated. The liquids must be electrically conducting liquids or must be made sufficiently electrically conducting so that the current passing through the liquid from the generator D will cause an electromagnetic reaction in the fluid. Also, by supplying electric current to heater wires 16 it is possible to test samples at varying elevated temperatures if desired.

From the above description of the illustrated embodiment of the invention it will be evident that an apparatus has been provided for generating a standing wave in a liquid which can be focused on the surface of a test specimen of solid material whereby the effect of cavitation in that liquid for the chosen specimen can be established.

It will also be evident that improved electromagnetic means has been provided for producing these cavitation effects in a simple and convenient apparatus.

It will also be evident that means has been provided to study the effects of cavitation of various liquids on selected specimens at various elevated temperatures.

While only a single embodiment of the invention has been illustrated and described, it will be understood that the construction and arrangement of various components of the apparatus may be varied considerably without departing from the scope of the invention.

I claim:

1. In an apparatus for testing metals for cavitation effects thereon of fluids, a vessel, a tube open at one end having its open end in said vessel, means for mounting a metal specimen in said vessel adjacent the open end of said tube, means for maintaining a column of electrically conducting fluid above said specimen in said vessel and in said tube, and electromagnetic means for setting up a standing wave in said fluid column including means for creating a constant magnetic field transversely through said tube and the column of liquid therein and a variable frequency A.C. generator having its leads connected to said tube at diametrically opposite points at the plane of said magnetic field and at right angles to the direction of flux in said field for passing the current generated in said generator through the liquid in said tube.

2. An apparatus for studying erosive action on a given test solid of cavitation in liquids comprising a vessel adapted to contain a selected liquid, a tube open at one end carried by said vessel having its open end in said vessel, means for supporting a test specimen in the liquid in said vessel beneath the open end of said tube, and electromagnetic means for generating resonant oscillations of the liquid column above said specimen including means for creating a constant magnetic field transversely through said tube and the column of liquid therein and a variable frequency A.C. generator having its leads connected to said tube at diametrically opposite points at the plane of said magnetic field and at right angles to the direction of flux in said field for passing the current generated in said generator through the liquid in said tube.

3. An apparatus for studying the erosive action on a given test solid of cavitation in liquids comprising a vessel adapted to contain a selected liquid, a tube open at one end carried by said vessel having its open end immersed in the liquid in said vessel, means for supporting a test specimen in the liquid in said vessel beneath the open end of said tube, electromagnetic means for generating resonant oscillations of the liquid column above said specimen including means for creating a constant magnetic field transversely through said tube and the column of liquid therein and a variable frequency A.C. generator having its leads connected to said tube at diametrically opposite points at the plane of said magnetic field and at right angles to the direction of flux in said field for passing the current generated in said generator through the liquid in said tube, and means for varying the resonant frequency of said liquid column for testing at different cavitation frequencies.

4. An apparatus for studying the erosive action on a given test solid of cavitation in liquids comprising a vessel forming a closed chamber having therein a selected conducting liquid, a tube open at one end, means for sealing said tube in said vessel with its open end in communication with the chamber therein, means for displacing liquid from said vessel into said tube, means for supporting a test specimen in said liquid beneath the open end of said tube, and means for setting up a standing wave in the column of liquid in said tube including electromagnetic means for generating resonant oscillations of the liquid column in said tube, said electromagnetic means including means for creating a constant magnetic field transversely through said tube and the column of liquid therein and a variable frequency A.C. generator having its leads connected to said tube at diametrically opposite points at the plane of said magnetic field and at right angles to the direction of flux in said field for passing the current generated in said generator through the liquid in said tube.

5. An apparatus for studying the erosive action on a given test solid of cavitation in liquids comprising a closed vessel adapted to contain a selected conducting liquid, a tube open at one end, means for sealing said tube in said vessel with its open end in communication with the chamber therein, means for controlling the admission into said chamber of an inert gas under pressure for displacing liquid therein into said tube, means forming a closure for the upper end of said tube, means controlling the escape of fluid from the upper end of said tube as said inert gas is admitted, means for supporting a test specimen in the liquid in said chamber beneath the open end of said tube, and electromagnetic means for setting up a standing wave in the column of liquid in said tube, said electromagnetic means including means for creating a constant magnetic field transversely through said tube and the column of liquid therein and a variable frequency A.C. generator having its leads connected to said tube at diametrically opposite points at the plane of said magnetic field and at right angles to the direction of flux in said field for passing the current generated in said generator through the liquid in said tube.

6. An apparatus for studying the erosive action on a given test solid of cavitation in liquids comprising a closed vessel forming a chamber adapted to contain a selected conducting liquid, a tube open at one end, means for sealing said tube in said vessel with its open end in communication with the chamber therein, means for controlling the admission into said chamber of an inert gas under pressure for displacing liquid therein into said tube, means forming a closure for the upper end of said tube, means controlling the escape of fluid from the upper end of said tube, means for supporting a test specimen in the liquid in said chamber beneath the open end of said tube, and electromagnetic means for setting up a standing wave in the column of liquid in said tube, said electromagnetic means including means for creating a constant magnetic field transversely through said tube and the column of liquid therein and a variable frequency A.C. generator having its leads connected to said tube at diametrically opposite points at the plane of said magnetic field and at right angles to the direction of flux in said field for passing the current generated in said generator through the liquid in said tube, said means for supporting the specimen having provision for axially adjusting the latter relative to the open end of said tube to permit the location of the surface of said specimen at the point of reflection of said standing wave.

7. An apparatus for studying the erosive action on a given test solid of cavitation in liquids comprising a closed vessel having therein a selected conducting liquid, a tube open at both ends, means for sealing said tube in said vessel with one of its open ends in communication with the liquid therein, means for supporting a test specimen in said vessel with a surface thereof exposed beneath said one end of said tube, means forming a closure for the other end of said tube including a piston reciprocable axially therein having a bleed passage therethrough, means for securing said piston in a plurality of adjusted positions, means controlling the passage of fluid through said bleed passage, means for displacing liquids from said vessel including means for controlling the admission of an inert gas under pressure into said vessel, and electromagnetic means for setting up a standing wave in the column of liquid in said tube, said electromagnetic means including means for creating a constant magnetic field transversely through said tube and the column of liquid therein and a variable frequency A.C. generator having its leads connected to said tube at diametrically opposite points at the plane of said magnetic field and at right angles to the direction of flux in said field for passing the current generated in said generator through the liquid in said tube.

8. An apparatus for producing cavitation in liquids comprising a closed vessel, a tube closed at one end having its open end extended into said vessel, an electrically conducting liquid in said vessel, means for introducing gas into said vessel for displacing liquid in said vessel upwardly into said tube, and means for generating resonant oscillations of the liquid in said tube including electromagnetic means for creating a constant magnetic field transversely through said tube and the column of liquid therein and a variable frequency A.C. generator having its leads connected to said tube at diametrically opposite points at the plane of said magnetic field and at right angles to the direction of flux in said field for passing the current generated in said generator through the liquid in said tube.

9. An apparatus for establishing a standing wave in a liquid comprising a closed vessel adapted to contain an electrically conducting liquid, an upright tube having its lower end extended into and immersed in the liquid in said vessel, means for varying the effective length of said tube comprising a telescoping member forming an axially adjustable closure for the upper end of said tube, means for introducing gas under pressure into said vessel for forcing liquid into said tube, electromagnetic means for setting up a constant magnetic field transversely of and through said tube and the liquid therein, a variable frequency A.C. generator, and electrical connections from said generator to said tube for passing current generated in said generator through the liquid in said tube at the plane of said magnetic field and at right angles to the direction of magnetic flux in said field.

10. An apparatus for establishing a standing wave in a liquid comprising a closed vessel adapted to contain an electrically conducting liquid, an electrically conducting tube having its lower end extended into and immersed in the liquid in said vessel, means for varying the effective length of said tube comprising a telescoping member forming a closure for the upper end of said tube, means for securing said member in a plurality of axially adjusted positions, means for introducing gas under pressure into said vessel for forcing liquid into said tube, electromagnetic means for setting up a constant magnetic field transversely of and through said tube and the liquid therein, a variable frequency A.C. generator, electrical connections from said generator to said tube for passing current generated in said generator through said tube and the liquid therein at the plane of said magnetic field and at right angles to the direction of flow of magnetic flux in said field, and means for varying the temperature of the liquid in said vessel.

11. An apparatus for testing solid materials for their resistance to cavitation in liquids by setting up a standing wave in a liquid comprising liquid containing means for supporting electrically conducting liquid in a column between a body of gas under pressure at each end, means for mounting a specimen to be tested at the end of said column, electromagnetic means for setting up a standing wave in said column of liquid including means for establishing a constant magnetic field through and at right angles to said liquid column, and means for oscillating said column at selected frequencies including an alternating current variable frequency generator for passing current through said column at right angles to the direction of the lines of force in said magnetic field and in the plane of said field.

12. An apparatus for testing solid materials for their resistance to cavitation in liquids comprising liquid containing means including a vertical tube open at its lower end for supporting electrically conducting liquid in a column between a body of gas under pressure at each end, means for mounting a specimen to be tested at the end of said column, and electro-magnetic means for setting up a standing wave in said column of liquid including means for establishing a constant magnetic field transversely of and through said liquid column, means for oscillating said column at selected frequencies including an alternating current variable frequency generator having leads connected to said tube for passing current through said column at right angles to the direction of flow of the magnetic flux in said magnetic field and in the plane of said field, and means for heating the liquid in said liquid containing means to an elevated temperature.

References Cited in the file of this patent

UNITED STATES PATENTS

| | | |
|---|---|---|
| 2,258,415 | Lago | Oct. 7, 1941 |
| 2,514,080 | Mason | July 4, 1950 |
| 2,669,873 | Gardner et al. | Feb. 23, 1954 |

OTHER REFERENCES

Journal of Applied Physics, vol. 15, June 1944, pp. 495–506. (A photostatic copy is in Div. 36, 73–67.)

Pages 255–257 of book entitled, Sonics, by Hueter and Bolt, pub. by John Wiley and Sons, Inc., N.Y. 1955. (A copy is in the Scientific Library of the Patent Office.)